July 11, 1967

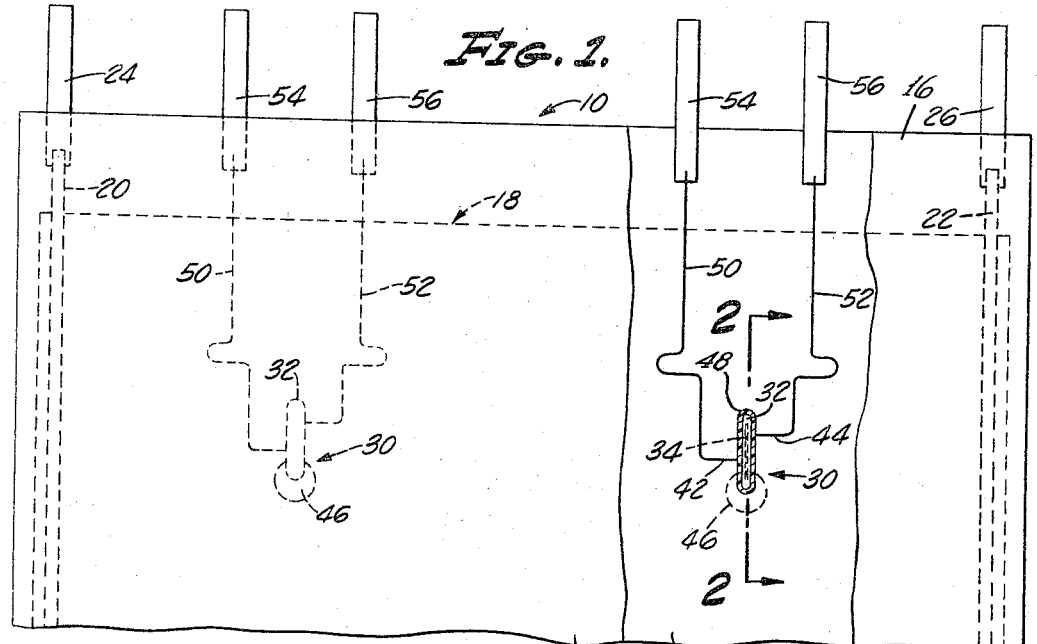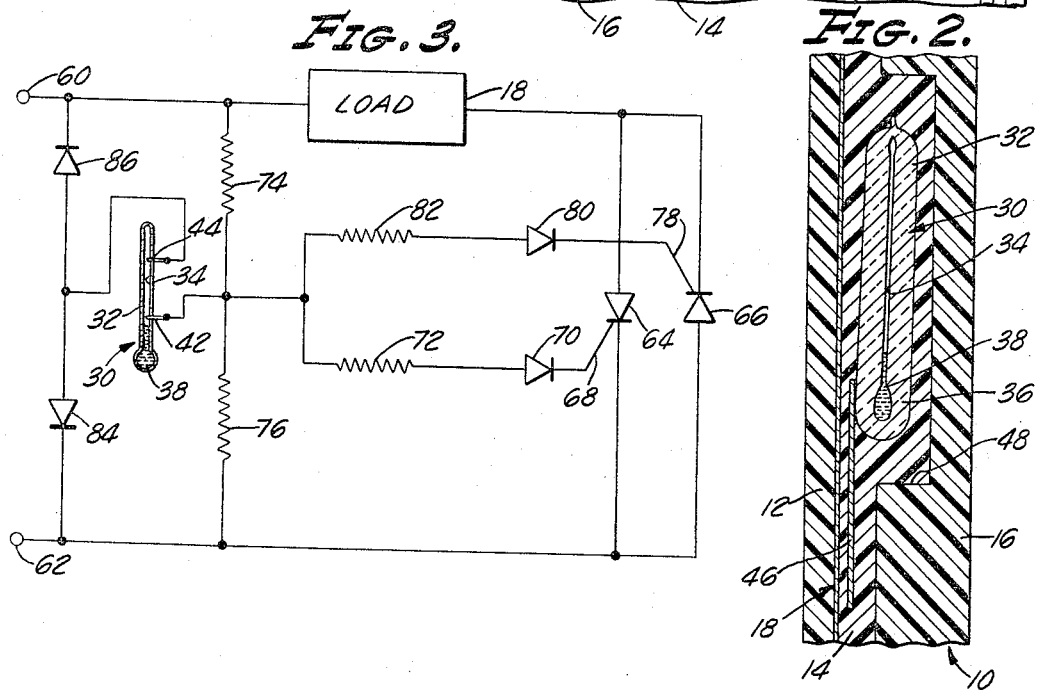

T. E. WHITSON 3,330,942

TEMPERATURE CONTROL SYSTEM

Filed April 1, 1964

INVENTOR.
THOMAS E. WHITSON
BY Lyon & Lyon
ATTORNEYS

United States Patent Office 3,330,942
Patented July 11, 1967

3,330,942
TEMPERATURE CONTROL SYSTEM
Thomas E. Whitson, Los Angeles, Calif., assignor to The Sierracin Corporation, Burbank, Calif., a corporation of California
Filed Apr. 1, 1964, Ser. No. 356,430
9 Claims. (Cl. 219—522)

This invention relates to a temperature control system and more particularly relates to a device and associated circuitry for controlling the temperature of a laminated structure or the like.

A number of systems have been devised for heating laminated structures such as aircraft windshields, generally for de-icing or de-fogging purposes. One of the most popular and satisfactory of such systems is the deposition of a layer or film of electrically conductive material or a network of small diameter metallic wire between the various sheets of structural material such as plastic or glass. The edges of the laminated structure are provided with bus bars in electrical contact with the conductive film or wires. Electrical energy is supplied through these bus bars to the heater film or wires with the result that heat is generated because of the inherent resistance of the film or wires.

It is desired, of course, to regulate the temperature level in the laminated structure, both to prevent the laminated structure from imposing self-damage by overheat and to achieve sufficient heating for de-icing or defogging purposes while keeping the expenditure of electrical energy to a minimum. Various devices and systems are presently available for performing this control function and usually utilize a temperature sensitive element embedded in the laminated structure or positioned closely adjacent thereto. The temperature sensitive element most commonly used in these systems is a wire wound grid sensor. This type sensor, while satisfactory in operation, is delicate, expensive, and relatively difficult to install or embed in a laminated structure.

It is therefore an object of the present invention to provide a temperature sensitive device which is inexpensive, light-weight, reliable and which may be easily embedded in a laminated structure.

It is also an object of the present invention to provide circuitry including such a temperature sensitive element embedded in a laminated structure heated by a conductive film for regulating the electrical energy supplied to said film.

These and other objects and advantages of the present invention will become more apparent upon reference to the accompanying description and drawings in which:

FIGURE 1 is a top plan view of a laminated structure including a temperature sensitive device according to the present invention;

FIGURE 2 is a sectional view taken along lines 2—2 of FIGURE 1;

FIGURE 3 is a schematic diagram of a control circuit according to a first embodiment of the present invention;

Figure 5:
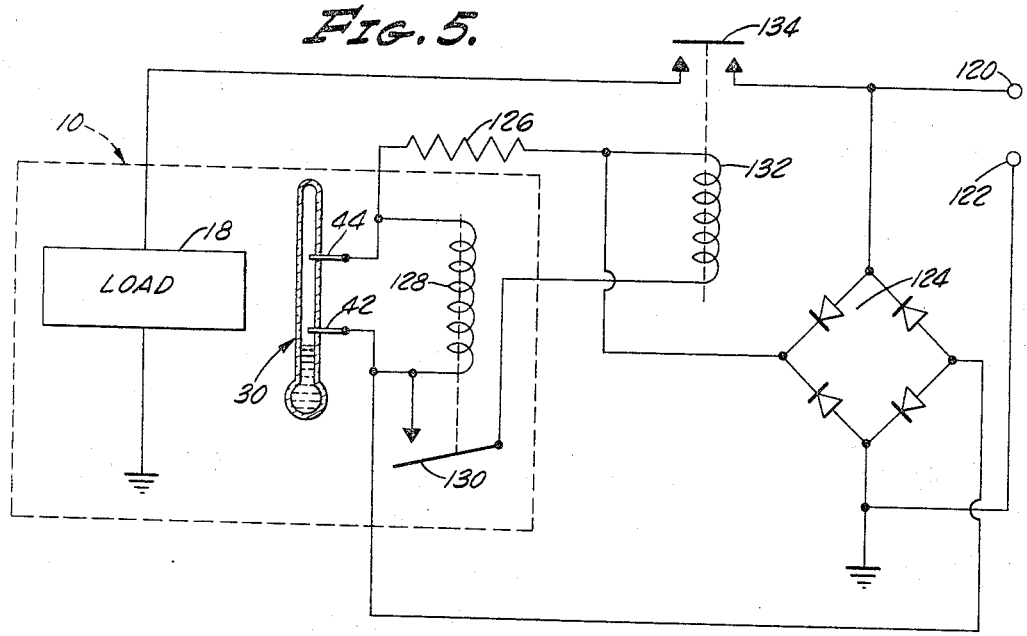
FIGURE 5 is a schematic diagram of a control circuit according to a third embodiment of the present invention.

Referring now to FIGURES 1 and 2, there is shown a laminated structure, generally indicated at 10, formed of a first outer layer 12, an intermediate layer 14, and a second outer layer 16. These layers are preferably of a transparent material such as a clear plastic or glass, and may each be formed of one or more individual sheets of material. A conductive film 18 is deposited on the lower layer 12 in any of the conventional manners known to the art. For example, this may be applied by thermally evaporating by vacuum techniques a metal such as gold, silver, copper, iron or nickel onto the layer 12, or by the application of any semiconductive material such as stannic oxide in any conventional manner.

Positioned at either end of the conductive film 18 and in electrical contact therewith are a pair of bus bars 20 and 22 which, for example, may be painted silver strips. Brass tabs 24 and 26 are positioned in electrical contact with the bus bars 20 and 22 and serve as terminals for connecting the bus bars and conductive film to an external circuit.

One or more temperature sensitive devices, generally indicated at 30, are embedded in the laminated structure just described. Each of the temperature sensitive devices 30 includes a small tube 32 of glass or plastic, the tube being provided with a central passageway 34 and a reservoir 36 for containing a body of mercury 38. A pair of contacts or terminals 42 and 44 extend through the walls of the tube 32 into the passageway 34. When the body of mercury is caused to expand by a rise in temperature to a point where it joins the two contacts 42 and 44, an electrical circuit is completed between them.

The portion of the tube 32 containing the mercury reservoir 36 is positioned in thermal contact with a thin metallic disk 46, preferably constructed of copper. This metallic disk is positioned in the intermediate layer 14 a predetermined distance from the conductive film 18 and picks up the heat generated when power is applied to the conductive film and transmits it to the body of mercury 38. The layer 16 is preferably provided with a cut-out or well 48 in which the tube 32 may be positioned.

As can be seen, the positioning of the disk 46 relative to the conductive film 18, the dimensions of the tube 32, and the distance between the contacts 42 and 44 determine the temperature of the laminated structure at which an electrical circuit will be completed between the contacts 42 and 44. These contacts are connected by suitable leads 50 and 52 to brass tabs 54 and 56 which serve as terminals to connect the sensing element to an external control circuit.

An example of such a circuit is shown in FIGURE 3. In this circuit, a single phase A.C. power supply is connected to terminals 60 and 62 and supplies power to a load, namely the conductive film 18, through a pair of oppositely poled silicon controlled rectifiers 64 and 66. The control electrode 68 of the rectifier 64 is connected through a diode 70 and a current limiting resistor 72 to the junction point of resistors 74 and 76 which are arranged as a voltage divider connected across the power supply. In a similar manner, the control electrode 78 of the rectifier 66 is connected through a diode 80 and a resistor 82 to the junction between the resistor 74 and 76.

One of the contacts 42 of the temperature sensitive element is also connected to this junction point and the other contact 44 is connected to the junction between two oppositely poled diodes 84 and 86 which are also connected across the power supply.

In this circuit, the flow of current from the power supply to the load 18 is controlled by the silicon controlled rectifiers 64 and 66. The gate currents of these rectifiers are supplied through the resistance network and through the diodes 70 and 80, these diodes serving to prevent gate current interaction between the silicon controlled rectifiers 64 and 66. When the proper temperature is achieved, the body of mercury 38 will have expanded to complete an electrical circuit between the contacts 42 and 44 of the temperature sensitive device 30. Completion of this circuit causes the current flow to be shunted on alternate half cycles through the diodes 84 and 86, thereby dropping the silicon controlled rectifier gate currents below the minimum necessary for their conduction. The silicon controlled rectifiers 64 and 66 now cease firing until the temperature is again reduced below the predetermined value and the mercury contacts to break the shunting circuit.

Figure 4:
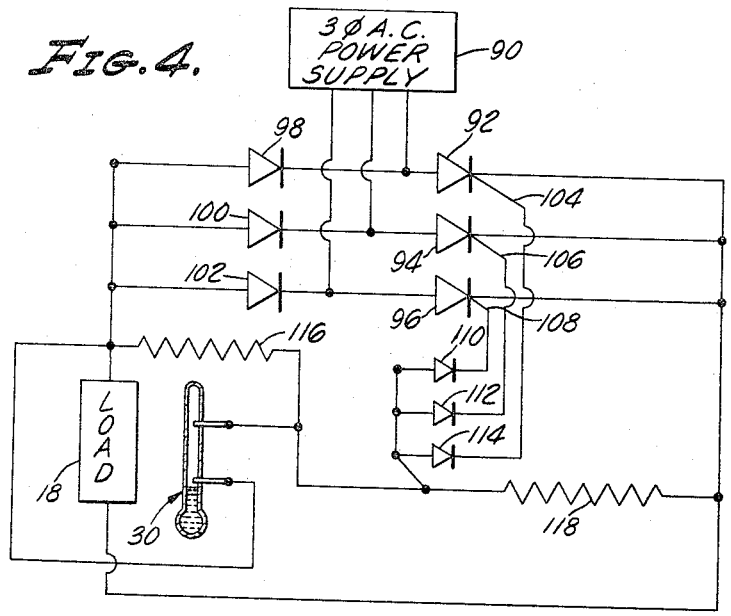
FIGURE 4 is a schematic diagram of a control circuit according to a second embodiment of the present invention.

Turning now to FIGURE 4, there is shown a circuit for controlling the application of three-phase power to a laminated structure of the type described. In this circuit, a three-phase A.C. power supply 90 is connected to the load 18 by means of a three-phase full wave rectifier composed of silicon controlled rectifiers 92, 94 and 96 and diodes 98, 100, and 102. The control electrodes 104, 106 and 108 of the silicon controlled rectifiers 92, 94 and 96 respectively are connected through diodes 110, 112 and 114 to the junction of resistors 116 and 118 which are connected in series across the load 18. The temperature sensitive element 30 is arranged in a circuit that shunts the resistor 116.

In operation, the silicon controlled rectifiers are normally biased into conduction by the voltage divider made up of resistors 116 and 118. The diodes 110, 112 and 114 being used solely to prevent gate current interaction among the three silicon controlled rectifiers. When the temperature of the laminated structure reaches the predetermined value, the temperature sensitive device closes the shunting circuit around the resistor 116 and thus reduces the bias voltage on the control electrodes 104, 106 and 108, thereby reducing the gate current to the minimum level. The silicon controlled rectifiers 92, 94 and 96 now cease conducting and remain in the non-conductive state until contraction of the mercury in the temperature sensitive device 30 breaks the shunt circuit around the resistor 116.

Turning now to FIGURE 5, there is shown yet another circuit for controlling the temperature in a laminated structure. An A.C. power supply is connected to the terminals 120 and 122 causing a current to flow through a full wave rectifier 124 and a current limiting resistor 126 to a relay coil 128 having an armature 130. When the coil 128 is energized, the armature 130 is drawn upwardly closing a circuit to a coil 132. Energization of the coil 132 closes a contactor 134 with the result that power is supplied to the load 18.

A temperature sensitive device 30 is connected in shunt with the coil 128. When the temperature in the laminated structure reaches the predetermined value, the mercury will expand and complete a circuit between the contacts 42 and 44 of the device 30, thus shunting the coil 128 and de-energizing it. De-energization of the coil 128 results in the armature 130 opening the circuit to the coil 132 which is consequently de-energized, and the contactor 134 is opened and breaks the circuit to the load 18.

If the relay 128–130 is installed in the laminated structure 10, as indicated in the dotted lines in FIGURE 5, the system is considered fail-safe, as failure of any one component, except the temperature sensitive device, will cause the system to shut down.

From the foregoing description it can be seen that the present invention provides a temperature sensitive device which is inexpensive, light-weight, and which may easily be installed in a laminated structure. Various circuits utilizing this device for controlling the power supplied to a conductive film embedded in the laminated structure are also provided. It is to be understood that the various circuit elements illustrated and described are illustrative only and may be replaced by others having equivalent characteristics.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. Apparatus for controlling the temperature of a laminated structure having a plurality of layers of electrically non-conductive material, electrical heating means positioned between two of said layers, and electrically conducting means connected to said heating means for supplying electrical energy thereto, comprising: a non-conductive tubular member, said tubular member having a closed, elongated passageway formed therein; a body of mercury positioned in said passageway; a pair of electrically conductive contact means mounted in the wall of said tubular member and extending through said wall into said passageway at spaced points along the length thereof; a thin metallic disk in thermal contact with said tubular member, said metallic disc and said tubular member being embedded in one of said layers a predetermined distance from said heating means whereby heat generated by said heating means will be transmitted by said disk to said body of mercury positioned in said tubular member; a three-phase A.C. power supply; a three-phase, full wave rectifier connecting said power supply to said electrically conducting means, said full wave rectifier including three controlled rectifiers, each of said controlled rectifiers having a control electrode; a voltage divider connected across said power supply and having a point thereon connected to said control electrodes to apply a bias signal thereto; and coupling means connecting said pair of contact means in a shunt circuit across a portion of said voltage divider whereby said control rectifiers are rendered non-conductive when said body of mercury expands to complete a circuit between said pair of contact means.

2. A temperature controlling circuit comprising: electrical heating means; electrically conducting means connected to said heating means for supplying electrical energy thereto; a tubular member, said tubular member having a closed, elongated passageway formed therein; a body of mercury positioned in said passageway; a pair of contact means mounted in the wall of said tubular member and extending through said wall into said passageway at spaced points along the length thereof; a metallic disk in thermal contact with said tubular member, said metallic disk and said tubular member being positioned adjacent said heating means whereby heat generated by said heating means will be transmitted by said disk to said body of mercury positioned in said tubular member; a three-phase A.C. power supply; a three-phase full wave rectifier connecting said power supply to said electrically conducting means, said full wave rectifier including three controlled rectifiers, each of said controlled rectifiers having a control electrode; a voltage divider connected across said power supply and having a point thereon connected to said control electrodes to apply a bias signal thereto; and coupling means connecting said pair of contact means in a shunt circuit across a portion of said voltage divider whereby said controlled rectifiers are rendered non-conductive when said body of mercury expands to complete a circuit between said pair of control means.

3. In a laminated transparent windshield structure having at least first and second outer layers and an intermediate layer, each of said layers being electrically non-conductive, a film of electrically conductive material deposited on the inner surface of said first outer layer and located between said first outer layer and an intermediate layer, and electrically conducting means connected to said conductive film for suplying power thereto, the improvement comprising: a non-conductive tubular member, said tubular member having a closed, elongated passageway and a reservoir formed therein; a body of mercury positioned in said reservoir; a pair of electrically conductive contact means mounted in the wall of said tubular member and extending through said wall into said passageway and spaced points along the length thereof; and a thin metallic disk in thermal contact with and located adjacent to said tubular member, said tubular member being embedded in a portion of said intermediate layer positioned in a well formed in said second outer member and being embedded a predetermined distance from said conductive film whereby heat generated by said film will be transmitted by said disk to said body of mercury positioned in said tubular member.

4. In a laminated transparent windshield structure having at least first and second outer layers and an intermediate layer, each of said layers being electrically non-conductive, a film of electrically conductive material deposited on the inner surface of said first outer layer and located between said first outer layer and an intermediate layer, and electrically conducting means connected to said conductive film for supplying power thereto, the improvement comprising: a non-conductive tubular member, said tubular member having a closed, elongated passageway and a reservoir formed therein; a body of mercury positioned in said reservoir; a pair of electrically conductive contact means mounted in the wall of said tubular member and extending through said wall into said passageway at spaced points along the length thereof; and a thin metallic disk in thermal contact with said tubular member and located adjacent to said tubular member between said tubular member and said conductive film, said metallic disk and said tubular member being embedded in said intermediate layer a predetermined distance away from said conductive film whereby heat generated by said film will be transmitted by said disk to said body of mercury positioned in said tubular member.

5. The structure of claim 4 including a source of electrical energy; circuit means operative to couple said source to said electrically conducting means; control means coupled to said circuit means for rendering said circuit means inoperative; and means coupling said pair of contact means with said control means whereby said control means is caused to render said circuit means inoperative when said body of mercury expands to complete a circuit between said pair of contact means.

6. The apparatus of claim 5 wherein said source of electrical energy is a single phase A.C. power supply; said circuit means include a pair of oppositely poled controlled rectifiers connecting said supply to said electrically conducting means, each of said controlled rectifiers having a control electrode; said control means includes a voltage divider connected across said power supply and having a point thereon connected to said control electrodes to apply a bias signal thereto; and said coupling means includes a pair of oppositely poled diodes connected across said power supply, means connecting the junction of said diodes to one of said contact means, and means connecting the other contact means to said point on said voltage divider.

7. The apparatus of claim 5 wherein said circuit means includes a pair of contacts and a member movable to connect said contacts and complete an electrical circuit between said source and said electrically conducting means; said control means includes a first coil energizable to move said movable member to connect said contacts and a second coil connected across said source and operable to cause said first coil to be energized; and said coupling means includes means coupling said pair of contact means in a shunt circuit across said second coil.

8. The apparatus of claim 5 wherein said source is an A.C. power supply; said circuit means includes a pair of contacts and a member movable to connect said contacts and complete an electrical circuit between said supply and said electrically conducting means; said control means includes a full wave rectifier connected to said power supply; a first coil energizable to move said movable member to connect said contacts, a second coil connected to said rectifier, means including an armature actuable by energization of said second coil for connecting said first coil to said rectifier; and said coupling means includes means coupling said pair of contact means in a shunt circuit across said second coil.

9. Apparatus for controlling the temperature of a laminated structure having a plurality of layers of electrically non-conductive material, electrical heating means positioned between two of said layers, and electrically conducting means connected to said heating means for supplying electrical energy thereto, comprising: a non-conductive tubular member, said tubular member having a closed, elongated passageway formed therein; a body of mercury positioned in said passageway; a pair of electrically conductive contact means mounted in the wall of said tubular member and extending through said wall into said passageway at spaced points along the length thereof; a thin metallic disk in thermal contact with said tubular member, said metallic disk and said tubular member being embedded in one of said layers a predetermined distance from said heating means whereby heat generated by said heating means will be transmitted by said disk to said body of mercury positioned in said tubular member; a source of electrical energy; circuit means operative to couple said source to said electrically conducting means; control means coupled to said circuit means for rendering said circuit means inoperative; and means coupling said pair of contact means with said control means whereby said control means is caused to render said circuit means inoperative when said body of mercury expands to complete a circuit between said pair of contact means wherein said circuit means includes at least one controlled rectifier having a control electrode; said control means including means for applying a bias signal to said control electrodes; and said coupling means including means for reducing said bias signal when a circuit is completed between said pair of contact means.

References Cited
UNITED STATES PATENTS

| | | | |
|---|---|---|---|
| 1,921,432 | 8/1933 | Stallard | 310—8.9 |
| 1,963,987 | 6/1934 | Gebhard et al. | 219—210 |
| 1,995,355 | 3/1935 | Koerner | 236—1 |
| 1,996,569 | 4/1935 | Byrnes et al. | 219—210 |
| 2,102,783 | 12/1937 | Bokovoy | 310—8.9 X |
| 2,114,396 | 4/1938 | McFarlan et al. | 219—528 |
| 2,490,433 | 12/1949 | Gunning et al. | 219—522 |
| 2,507,036 | 5/1950 | McCrumm et al. | 215—203 |
| 2,513,993 | 7/1950 | Burton | 219—543 |
| 3,231,718 | 1/1966 | Vasile | 219—465 |

RICHARD M. WOOD, *Primary Examiner.*

V. Y. MAYEWSKY, *Assistant Examiner.*